THEODORE A. CASE, OF ELLINGTON, NEW YORK.

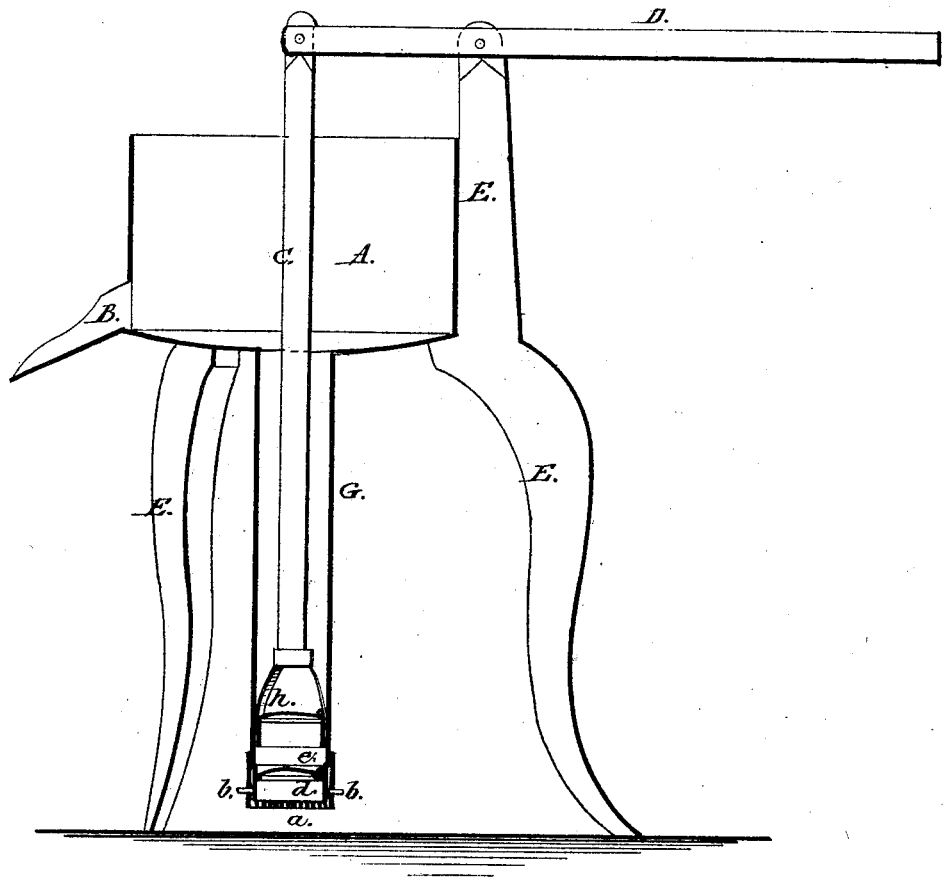

Letters Patent No. 90,424, dated May 25, 1869.

IMPROVEMENT IN CREAM-PUMP.

The Schedule referred to in these Letters Patent and making part of the same.

*To all whom it may concern:*

Be it known that I, THEODORE A. CASE, of Ellington, in the county of Chautauqua, and State of New York, have invented a new and useful Improvement in Cream-Pumps; and I do hereby declare that the following is a full, clear, and exact description thereof, which will enable others skilled in the art to make and use the same, reference being had to the accompanying drawing, forming part of this specification, in which the drawing represents a central vertical section of my improved pump.

Similar letters of reference indicate like parts.

The object of this invention is to provide a convenient and effective apparatus for preparing cream for churning, by breaking up the pellicles, or "white-caps," so called, which, being broken, add to the richness and quality of the butter, but if unbroken, would pass off with the buttermilk.

The retention of this portion of the product is estimated by dairymen to add ten per centum to the quality of the butter, as well as to greatly enhance the richness and flavor of the same.

It consists of a vessel, A, of any suitable form, supported on legs E, or their equivalent, and provided with a tubular extension, G, which serves as a pump-barrel for the rod C, and any suitable bucket or valve-device, $h$, such as constitutes pump-mechanism.

The strainer $a$ is affixed to the bottom of a short cylinder, $d$, which is provided with stud-pins $b\,b$, fitting in L-shaped slots made in the lower end of the pump-barrel, in a manner similar to the means of attaching the lamps of lanterns to the frame of the same.

The strainer is thus removable, to admit of the cleansing of the pump-barrel, for the lower valve $e$ is pivoted in the said cylinder, and when it and the pump-rod are withdrawn, the pump-barrel is merely a plane cylindrical tube, which may be conveniently washed.

B is a spout, to discharge the cream pumped up into the vessel A.

The pump-handle D is pivoted to the standard E, which is a continuation of one of the legs, and to the rod C.

The pivot-pins may be easily withdrawn, to take the apparatus apart for cleaning.

The strainer-cap, or cylinder may be attached to the pump-barrel by any suitable device which will permit its convenient removal, when requisite.

Having thus described my invention,

I claim as new, and desire to secure by Letters Patent—

The arrangement of the elevated vessel A, having the spout B, the tubular pendent extension G, the removable cylinder $d$, carrying the strainer $a$ and valve $e$, and the piston-rod C and valve-bucket $h$, as herein described, for the purpose specified.

THEO. A. CASE.

Witnesses:
J. F. BAXTER,
M. M. BROOKS.